US009205598B2

(12) United States Patent
Heck et al.

(10) Patent No.: US 9,205,598 B2
(45) Date of Patent: Dec. 8, 2015

(54) METHOD OF MANUFACTURING A FLEXIBLE PORTABLE ELECTRONIC DEVICE

(71) Applicant: The Swatch Group Research and Development Ltd, Marin (CH)

(72) Inventors: Pascal Heck, Erlach (CH); Cedric Nicolas, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 185 days.

(21) Appl. No.: 14/107,126

(22) Filed: Dec. 16, 2013

(65) Prior Publication Data

US 2014/0166192 A1 Jun. 19, 2014

(30) Foreign Application Priority Data

Dec. 17, 2012 (EP) .................................... 12197482

(51) Int. Cl.
*B29C 65/74* (2006.01)
*B29C 45/14* (2006.01)
(Continued)

(52) U.S. Cl.
CPC ................. *B29C 65/74* (2013.01); *B29C 43/26* (2013.01); *B29C 43/28* (2013.01); *B29C 45/0053* (2013.01); *B29C 45/14016* (2013.01); *B29C 45/14024* (2013.01); *B29C 65/16* (2013.01);
(Continued)

(58) Field of Classification Search
CPC ................. B29C 45/14016; B29C 2045/0079; B29C 66/433; B29C 64/74; B29C 65/74; B29L 2031/3481; G04G 17/08; G04G 17/083
See application file for complete search history.

(56) References Cited

U.S. PATENT DOCUMENTS 3,562,037 A 2/1971 Travis
4,682,415 A 7/1987 Adell
(Continued)

FOREIGN PATENT DOCUMENTS

DE 3813409 A1 * 11/1989
EP 1248165 A1 * 10/2002
(Continued)

OTHER PUBLICATIONS

European Search Report issued May 22, 2013 in EP Application 12197482, filed on Dec. 17, 2012 ( with English Translation).

*Primary Examiner* — William Bell
(74) *Attorney, Agent, or Firm* — Oblon, McClelland, Maier & Neustadt, L.L.P.

(57) ABSTRACT

Method of mass producing a flexible portable electronic device capable of at least processing information, the method including the steps consisting in passing a first impermeable plastic strip through an overmolding station in which the first impermeable plastic strip is overmolded using a plastic material,
the method further including the steps consisting in passing a second impermeable plastic strip with a bottom surface facing upwards, in succession:
through a printing station in which the second impermeable plastic strip receives, on the bottom surface thereof, at least one decorative ink;
through an assembly station in which the second impermeable plastic strip receives, in various places on the bottom surface thereof, the electronic assemblies for processing information,
joining and welding the first overmolded impermeable plastic strip to the second decorated impermeable plastic strip, and then in cutting out and releasing the portable electronic devices.

2 Claims, 2 Drawing Sheets

(51) Int. Cl.
  *B29C 43/26* (2006.01)
  *B29C 43/28* (2006.01)
  *B29C 45/00* (2006.01)
  *B29C 69/02* (2006.01)
  *G04G 17/08* (2006.01)
  *B29C 43/14* (2006.01)
  *B29C 43/18* (2006.01)
  *B29L 31/34* (2006.01)
  *B29C 65/16* (2006.01)
  *B29C 65/00* (2006.01)

(52) U.S. Cl.
  CPC ....... *B29C 65/1654* (2013.01); *B29C 66/83411* (2013.01); *B29C 69/02* (2013.01); *B29C 43/14* (2013.01); *B29C 43/18* (2013.01); *B29C 65/1635* (2013.01); *B29C 65/1683* (2013.01); *B29C 66/0346* (2013.01); *B29C 66/1122* (2013.01); *B29C 66/433* (2013.01); *B29C 2045/0079* (2013.01); *B29C 2791/001* (2013.01); *B29C 2793/009* (2013.01); *B29L 2031/3481* (2013.01); *G04G 17/08* (2013.01); *G04G 17/083* (2013.01)

(56) References Cited

U.S. PATENT DOCUMENTS

| | | | |
|---|---|---|---|
| 6,621,766 B2 * | 9/2003 | Brewer et al. | 368/82 |
| 2001/0043513 A1 * | 11/2001 | Grupp | 368/281 |
| 2006/0051985 A1 * | 3/2006 | Chen et al. | 439/67 |
| 2007/0022602 A1 | 2/2007 | Kingsford et al. | |
| 2008/0002528 A1 * | 1/2008 | Andren et al. | 368/241 |
| 2008/0037374 A1 * | 2/2008 | Chu et al. | 368/82 |
| 2009/0020613 A1 * | 1/2009 | Chang et al. | 235/492 |
| 2011/0051569 A1 | 3/2011 | Kitahara et al. | |
| 2014/0036638 A1 * | 2/2014 | Gough et al. | 368/10 |

FOREIGN PATENT DOCUMENTS

| | | | |
|---|---|---|---|
| EP | 2484243 A1 * | 8/2012 | |
| GB | 1 491 532 | 11/1977 | |
| JP | 2003-164499 | 6/2003 | |
| WO | WO 0059327 A1 * | 10/2000 | |
| WO | WO 0188636 A1 * | 11/2001 | |
| WO | WO 2006039859 A1 * | 4/2006 | |
| WO | WO 2007138161 A1 * | 12/2007 | |
| WO | WO 2011103317 A1 * | 8/2011 | |

* cited by examiner

METHOD OF MANUFACTURING A FLEXIBLE PORTABLE ELECTRONIC DEVICE

This application claims priority from European Patent Application No. 12197482.8 filed 17 Dec. 2012, the entire disclosure of which is incorporated herein by reference.

FIELD OF THE INVENTION

The present invention concerns a method of manufacturing a flexible portable electronic device. More specifically, the present invention concerns a method of manufacturing this type of flexible portable electronic device in strips.

SUMMARY OF THE INVENTION

It is an object of the present invention to manufacture a flexible portable electronic device capable of at least elaborating or processing information, said portable electronic device including a flexible body, arranged to be capable of being secured to a part of a user's body, and an electronic assembly for processing information. The body of the portable electronic device is formed of a layer of plastic material such as an elastomer, which gives the portable electronic device thickness and mechanical resistance. This layer of plastic material is coated with a first impermeable plastic film, a second impermeable plastic film being secured to an external perimeter of the first impermeable plastic film. The electronic assembly for elaborating information is arranged between the first and second impermeable plastic films.

To make this type of flexible portable electronic device, a piece-by-piece manufacturing method consists in performing the following operations:

overmoulding a layer of flexible plastic material, which forms the body of the portable electronic device, on an external face of a first impermeable plastic film;

mounting the electronic assembly for processing information on the inner face side of the first impermeable plastic film, and securing a second impermeable plastic film onto the first impermeable plastic film, so as to delimit, between the first and second impermeable plastic films, an impermeable capsule or cavity which houses the electronic assembly for processing information.

Where necessary, the method may include an additional step which consists, before overmoulding the first impermeable plastic film, in thermoforming the first impermeable plastic film to give the first impermeable plastic film a desired contour.

This type of piece-by-piece manufacturing method is suitable for small scale manufacturing, typically for manufacturing prototypes for validating a design. It will be clear, however, that a piece-by-piece manufacturing method of this type cannot be envisaged for large scale manufacturing.

It is an object of the present invention to answer these requirements by providing a method of mass producing flexible portable electronic devices, said manufacturing method having, in particular, a large degree of freedom as to the choice of the shapes, thickness and decoration of the portable electronic devices.

The present invention therefore concerns a method of mass producing a flexible portable electronic device capable of at least processing information, the portable electronic device including an electronic assembly for processing information, the method including the steps consisting in passing a first impermeable plastic strip through an overmoulding station in which the first impermeable plastic strip is overmoulded using a flexible plastic material which will give the resulting flexible portable electronic devices thickness and mechanical resistance, the method further including the steps consisting in passing a second impermeable plastic strip with a bottom surface facing upwards, in succession:

through a printing station in which the bottom surface of the second impermeable plastic strip receives at least a decorative ink;

through an assembling station in which the bottom surface of the second impermeable plastic strip receives, at various locations, the electronic assemblies for processing information.

Finally the method includes the step consisting in joining and securing the first overmoulded impermeable plastic strip with the second decorated impermeable plastic strip, then in cutting out and releasing the flexible portable electronic devices.

As a result of these features, the present invention provides a method of manufacturing in strips a flexible portable electronic device in which it is possible, by using the same, single manufacturing line, to develop the portable electronic devices with different shapes, thicknesses, flexible body materials and decorations. It is also possible to envisage adapting the models of portable electronic devices in real time, or online by the action of the buyer.

According to a complementary feature of the invention, the manufacturing method includes the step consisting, before the initial step of overmoulding the first impermeable plastic strip, in moving the first impermeable plastic strip through a thermoforming station to arrange a plurality of housings, each intended to subsequently receive at least one internal component of the flexible portable electronic device, at various locations in the first impermeable plastic strip.

BRIEF DESCRIPTION OF THE DRAWINGS

Other features and advantages of the present invention will appear more clearly from the following detailed description of an implementation of the manufacturing method according to the invention, this example being given purely by way of non-limiting illustration with reference to the annexed drawing, in which.

DETAILED DESCRIPTION OF THE PREFERRED EMBODIMENTS

The present invention proceeds from the general inventive idea which consists in providing a method of manufacturing a flexible portable electronic device wherein a first part of the assembling operations is performed on a first flexible impermeable strip, while a second part of the assembling operations is performed on a second flexible impermeable strip, the first and second impermeable strips being assembled in a last manufacturing step, and then cut to release the individual portable electronic devices.

Figure 1A:
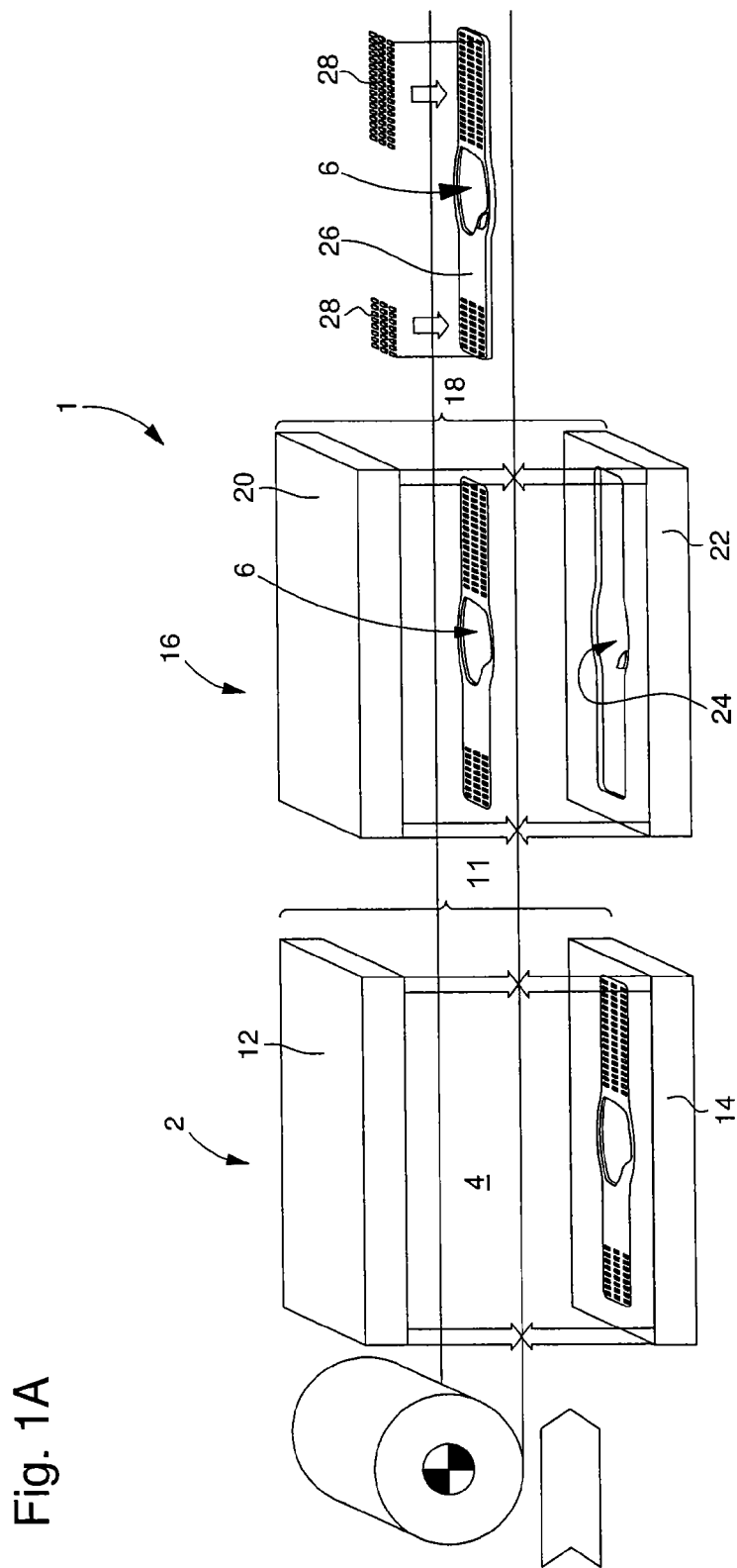
FIG. 1A is a diagram of the left part of a manufacturing plant for implementing the method of the invention.
Figure 1B:
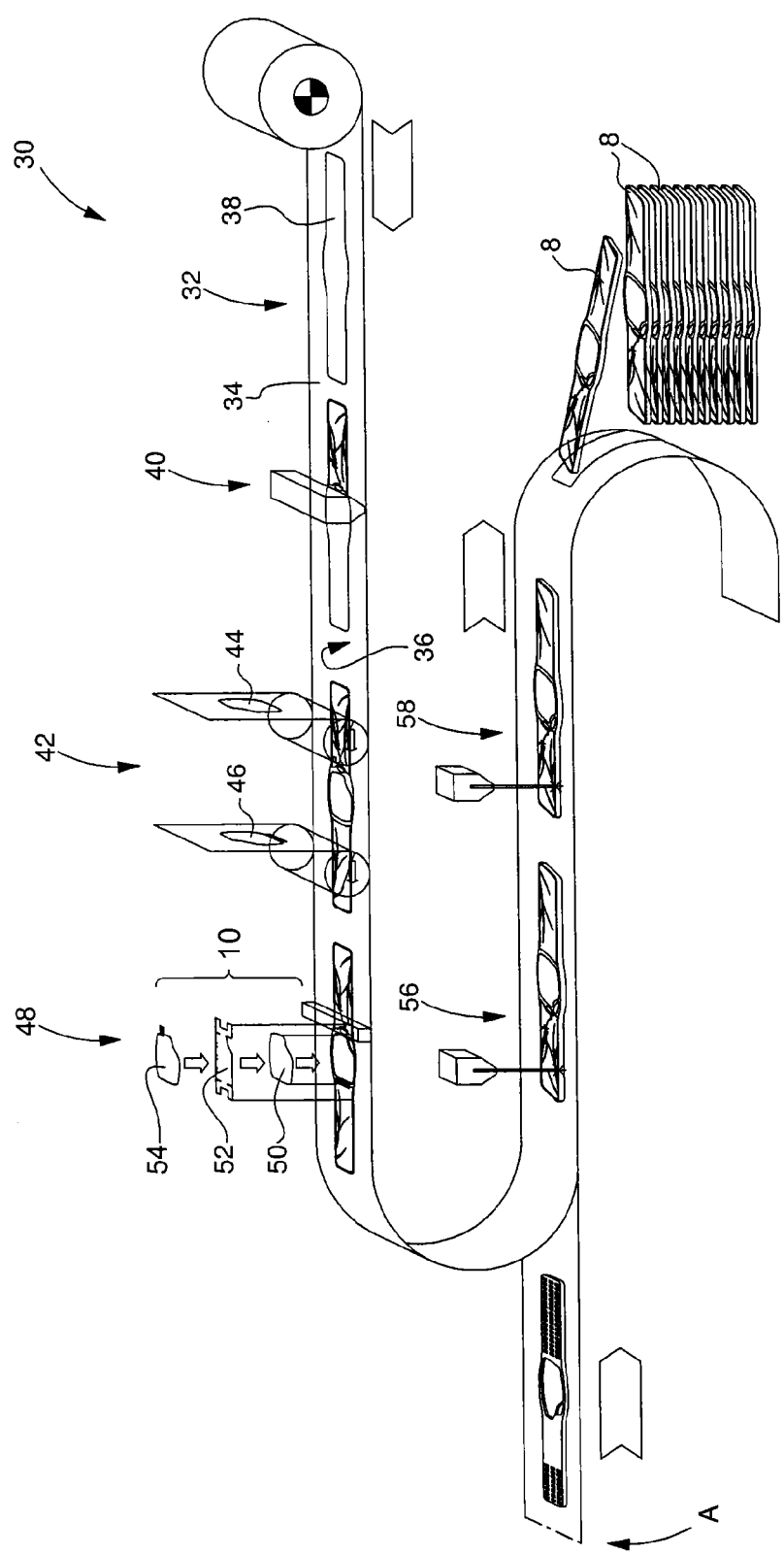
FIG. 1B is a diagram of the right part of a manufacturing plant for implementing the method of the invention, this Figure completing FIG. 1A.

FIG. 1A is a diagram of the left part of a manufacturing plant for implementing the method of the invention, while FIG. 1B is a diagram of the right part of the manufacturing plant for implementing the method of the invention, the combination of FIGS. 1A and 1B illustrating the manufacturing plant as a whole. It will be noted that the left part of the manufacturing plant illustrated in FIG. 1A is connected to the right part of the manufacturing plant illustrated in FIG. 1B in an area marked with an arrow A in FIG. 1B.

Designated as a whole by the general reference numeral 1, the left part of the manufacturing plant for implementing the manufacturing method of the invention includes a thermoforming station 2 through which from left to right in the drawing there is made to pass a first impermeable plastic strip 4 to arrange in places in the first impermeable plastic strip 4 a plurality of housings 6 each intended to subsequently receive at least one internal component of flexible portable electronic device 8, such as an electronic assembly 10 for elaborating or processing information. This technique consists in hot pressing first impermeable plastic strip 4 in a first mould 11 comprising two pattern cavities 12 and 14 which have complementary shapes matching the contour required to be given to impermeable plastic strip 4. It will be noted that this operation is optional and depends only upon the sharpness of the shape to be replicated. Where necessary, this operation may be performed at the same time as the moulding operation described above.

After thermoforming immediately followed by cooling, first impermeable plastic strip 4 is overmoulded with a flexible plastic material, for example an elastomer, which will give the resulting portable electronic devices 8 a thickness and volume making said electronic devices 8 comfortable to wear. This technique is commonly known as film insert moulding. To that end, first impermeable plastic strip 4 is passed through an overmoulding station 16. This overmoulding station 16 includes a second mould 18 with a top part 20 identical to the pattern cavity 12 of the first mould 11 and a bottom part 22. Top part 20 of second mould 18, against which first impermeable plastic strip 4 is pressed, has a contour matching that of first impermeable plastic strip 4, and bottom part 22 has exclusion areas 24 at the places where the plastic material used to make bodies 26 of portable electronic devices 14 will be injected.

At the end of the manufacturing steps described above, there is formed in first impermeable plastic strip 4 a plurality of plastic bodies 26 which still form a single piece with impermeable plastic strip 4 and which have substantially the shape of a band or bracelet. The manufacturing method may be supplemented by a step of inserting bracelet fastening elements 28 such as magnets.

Designated as a whole by the general reference numeral 30, the right part of the plant for implementing the manufacturing method of the invention includes a heat transfer station 32 through which there passes, from right to left in the drawing, a second impermeable plastic strip 34, which receives, in places, on a bottom surface 36, a layer 38 of material able to absorb laser radiation.

Second impermeable plastic strip 34 then passes into a printing station 40 in which the second impermeable plastic strip 34 receives at least one decorative ink on bottom surface 36.

The second impermeable plastic strip 34 then also passes through a lamination station 42 in which an adhesive film 44 and a flexible display device 46, such as a liquid crystal display cell, are laminated in succession on bottom surface 36 of second impermeable plastic strip 34. Adhesive film 44 allows the securing of the flexible display device 46 to bottom surface 36 of second impermeable plastic strip 34.

Second impermeable plastic strip 34 then finally passes into an assembly station 48 in which second impermeable plastic strip 34 receives, in places, over bottom surface 36, the electronic assemblies 8 for processing information. In the example shown in the drawing, portable electronic devices 14 are arranged to process, in particular, time-related information. For this purpose, each electronic assembly 8 includes, in addition to flexible display device 46, a light guide 50, arranged underneath flexible display device 46 and arranged to backlight said device. The assembly is completed by a flexible printed circuit 52 on which there are mounted the various integrated and discrete electronic components (not visible in the drawing) required for the proper operation of portable electronic device 14, such as, in particular, a time base. Electronic assembly 8 is powered by means of a flexible battery 54.

Finally, the method includes the step consisting in joining and securing the first overmoulded impermeable plastic strip 4 to the second decorated impermeable plastic strip 34 and then in cutting out and releasing the flexible portable electronic devices 14.

The manufacture of portable electronic device 14 according to the invention is complete when second impermeable plastic strip 34 is secured to first impermeable plastic strip 4. To that end, the first and second impermeable plastic strips 4 and 34 converge in a laser welding station 56 in which second impermeable plastic strip 34 is secured to the perimeter of first impermeable plastic strip 4. The two impermeable plastic strips 4 and 34 thereby joined pass finally into a laser cutting station 58 in which the individual flexible portable electronic devices 14 are separated.

It goes without saying that this invention is not limited to the implementation of the manufacturing method of the invention that has just been described and that various simple modifications and variants can be envisaged by those skilled in the art without departing from the scope of the invention as defined by the annexed claims.

What is claimed is:

1. A method of mass producing a flexible portable electronic device capable of at least processing information, the portable electronic device including an electronic assembly for processing information, the method including the steps of passing a first impermeable plastic strip through an overmoulding station in which the first impermeable plastic strip is overmoulded using a flexible plastic material which will give the resulting flexible portable electronic devices a thickness and a mechanical resistance, the method further including the steps of passing a second impermeable plastic strip with a bottom surface facing upwards, in succession:
through a printing station in which the second impermeable plastic strip receives, on the bottom surface thereof, at least one decorative ink;
through an assembly station in which the second impermeable plastic strip receives, in various places on the bottom surface thereof, the electronic assemblies for processing information, the method further including the step of joining and welding the first overmoulded impermeable plastic strip to the second decorated impermeable plastic strip, and then in cutting out and releasing the portable electronic devices.

2. The manufacturing method according to claim 1, wherein, before the initial step of overmoulding the first impermeable plastic strip, the first impermeable plastic strip is passed through a thermoforming station for arranging, at various places in the first impermeable plastic strip, a plurality of housings each intended to subsequently receive at least one internal component of the flexible portable electronic device.

* * * * *